Oct. 4, 1966   C. R. THATCHER   3,276,610
LOADING DEVICE FOR PICKUPS AND OTHER VEHICLES
Filed Nov. 13, 1964   4 Sheets-Sheet 1

INVENTOR.
CHESTER R. THATCHER
BY
Victor J. Evans & Co.
Attorneys

Oct. 4, 1966 C. R. THATCHER 3,276,610
LOADING DEVICE FOR PICKUPS AND OTHER VEHICLES
Filed Nov. 13, 1964 4 Sheets-Sheet 2
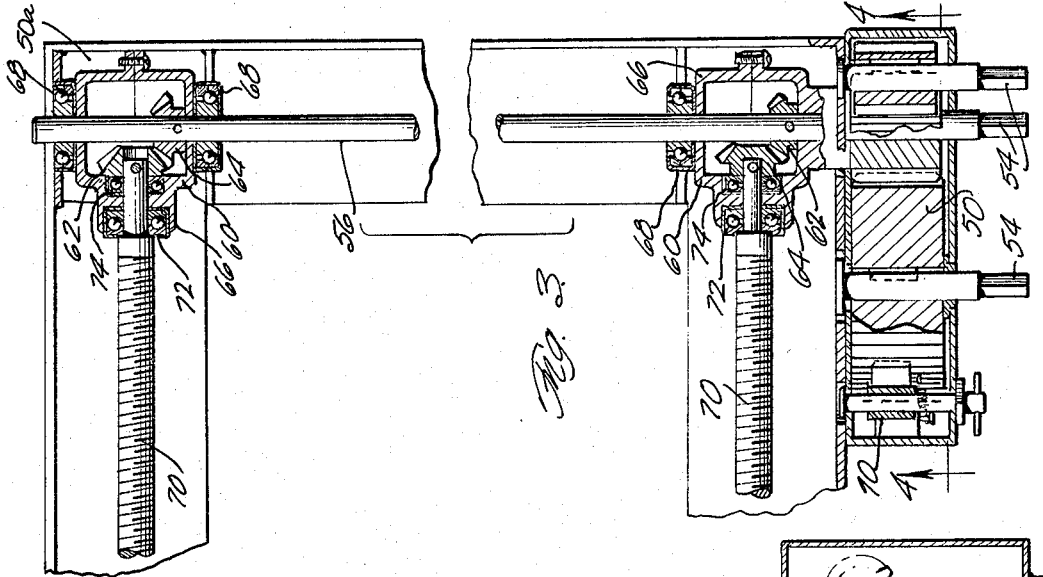
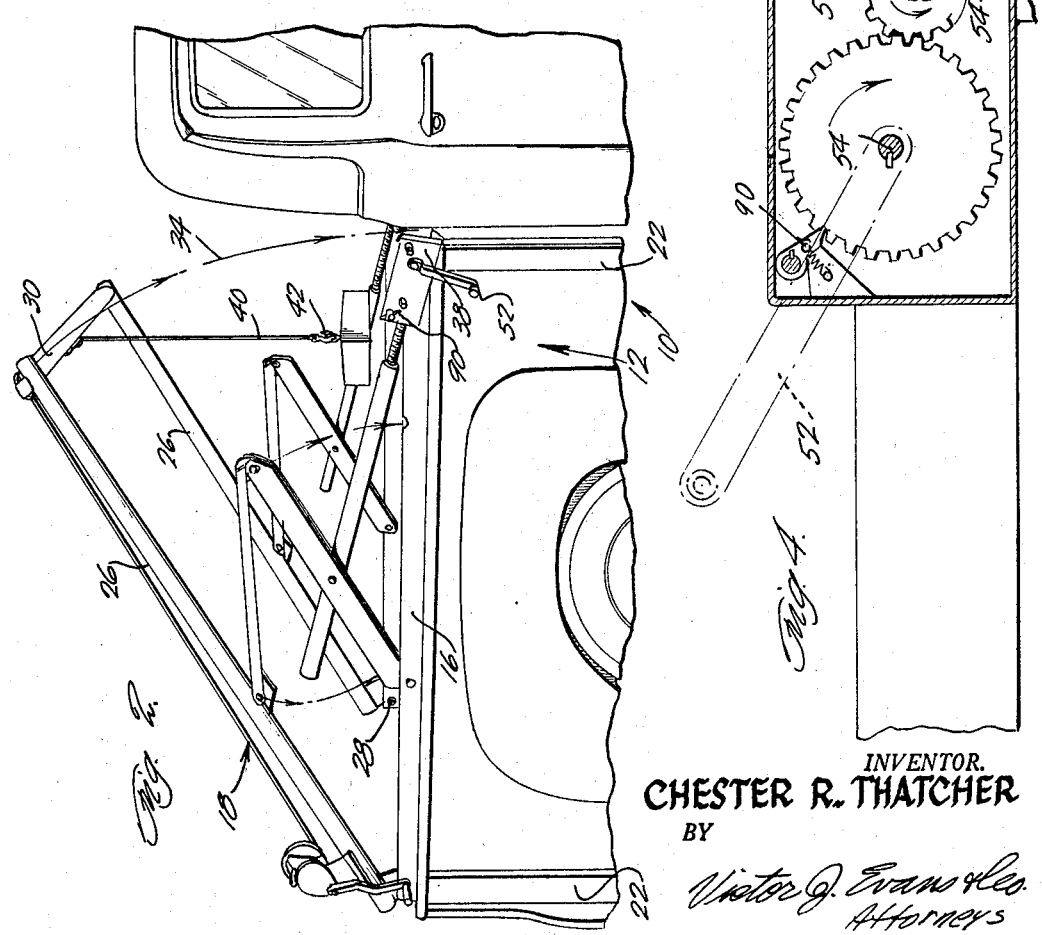
INVENTOR.
CHESTER R. THATCHER
BY
*Victor J. Evans & Co.*
*Attorneys*

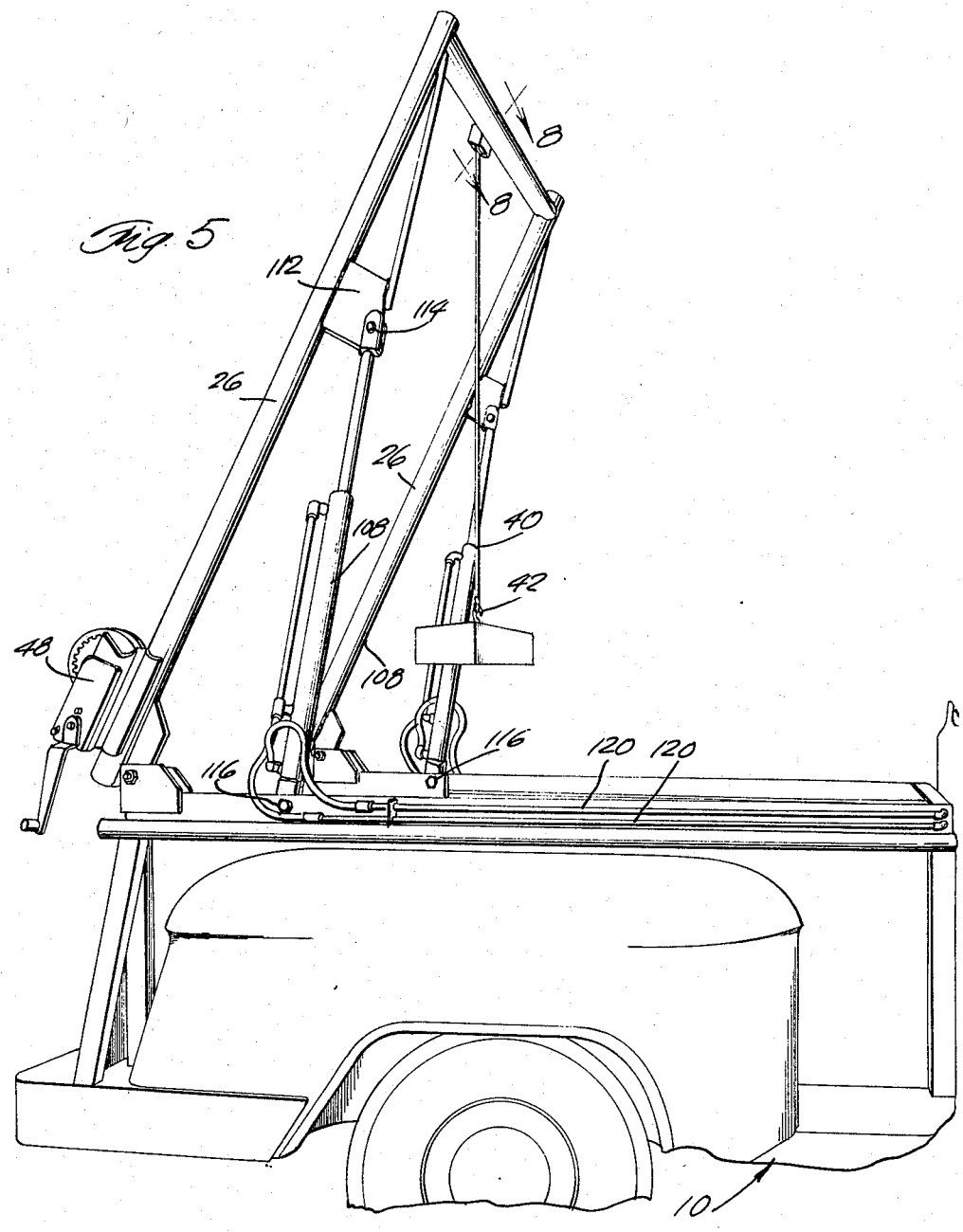

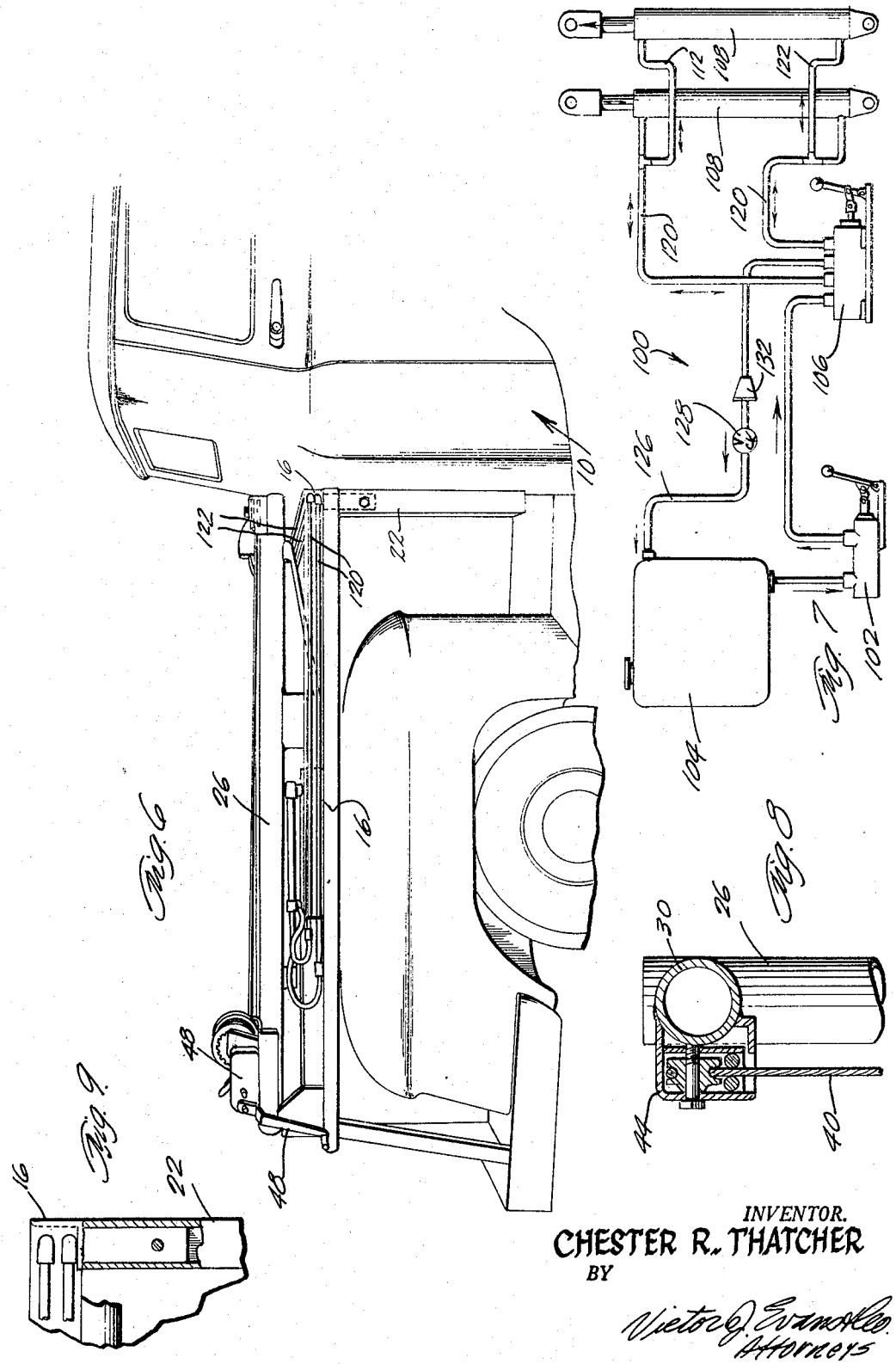

United States Patent Office 3,276,610
Patented Oct. 4, 1966

3,276,610
LOADING DEVICE FOR PICKUPS AND OTHER
VEHICLES
Chester R. Thatcher, 2913 E. 24th St.,
Farmington, N. Mex.
Filed Nov. 13, 1964, Ser. No. 411,078
4 Claims. (Cl. 214—77)

The present invention relates to a loading device adapted to be installed separately or manufactured integrally with pickup trucks and other vehicles, which may be operated hydraulically or by mechanical operative means, and at the same time provide no obstructions in use of the bed of the pickup vehicle since the loading device is completely and entirely mounted from and contiguous with the peripheral portions of the vehicle bed.

More particularly, the invention has reference to an improved and new apparatus in which all the components of the loading device, whether it is hydraulically operated or mechanically operated, when carried in the stored position provide no interference with the load space of the vehicle bed of a pickup truck to which the invention is applied.

It is therefore an object of the invention to provide a mounted loader which is, when in the stored position, such that it provides no interference with the use of the load space of the vehicle.

A further object of the present invention is to provide a loading device for vehicles which is adequately installed to provide an equal and balanced distribution of weight and moment throughout the vehicle so that the load may be centered at all times with respect to the sides of the vehicle.

An additional object of the present invention is to provide a loading device that may be made in different sizes and adjustable for different sized vehicles for allowing the mast to be used as gin poles to pick up and hold objects, as desired.

A further object of the invention is to provide an apparatus for minimum handling in placing a load in the vehicle as well as in unloading the vehicle.

A further object of the invention is to provide a loading apparatus that is faster and easier in use and installation, as well as selectively provide a choice in whether the construction is of hydraulic or mechanical nature.

The invention seeks to provide a self-loading and unloading device mounted on vehicles such as pickup trucks, in which the component parts are normally carried in a stored position around the peripheral contour of the bed of the vehicle. Along the periphery of the vehicle bed, the loading apparatus takes up a minimum space and substantially no portion of the bed space of the vehicle.

The purpose of the invention, therefore, is to provide a loader device mounted on a vehicle to be available at all times to facilitate loading and unloading of heavy objects. The load may be picked up, loaded, hauled and unloaded from the same vehicle without the use of further apparatus. One embodiment of the invention is provided with a loader that has means adapted to be used for gin poles.

More particularly, the invention includes mechanical and hydraulic models in whic the loader consists of a subframe that follows the contour of the peripheral portion of the vehicle bed and is secured to the edge of the bed by anchor posts inserted into stake pockets and pinned thereon. A mast consisting of a pair of poles and a crossbar is hinged to the rear extremity of the subframe of the pickup vehicle, and the mast is carried in a normally stored position over the forward portions of the subframe and is raised or lowered by hydraulic or mechanical power attachments from a stored position to a fully raised position as well as up and behind the vehicle. A winch is employed to pick up and lower the load by a cable running through sheaves. Guide rollers are installed in conjunction with the sheaves to keep the cable lined up with the sheaves in all positions. A hook may be attached of course to the cable at the end for grasping the load, as desired.

Other objects and advantages of the invention will be apparent from a detailed description and from the appended drawings and claims. In the drawings:

FIGURE 2 is a generally right side perspective view of the loading device in which the masts are being lowered into their rest position;

FIGURES 3 and 4 are details of the mechanically operated model shown in FIGURES 1 and 2;

FIGURES 5 and 6 show generally right side perspective views of the loading device in accordance with the hydraulically operated model thereof; and FIGURES 7, 8 and 9 show component detailed portions the hydraulically operated model of the invention.

Figure 1:
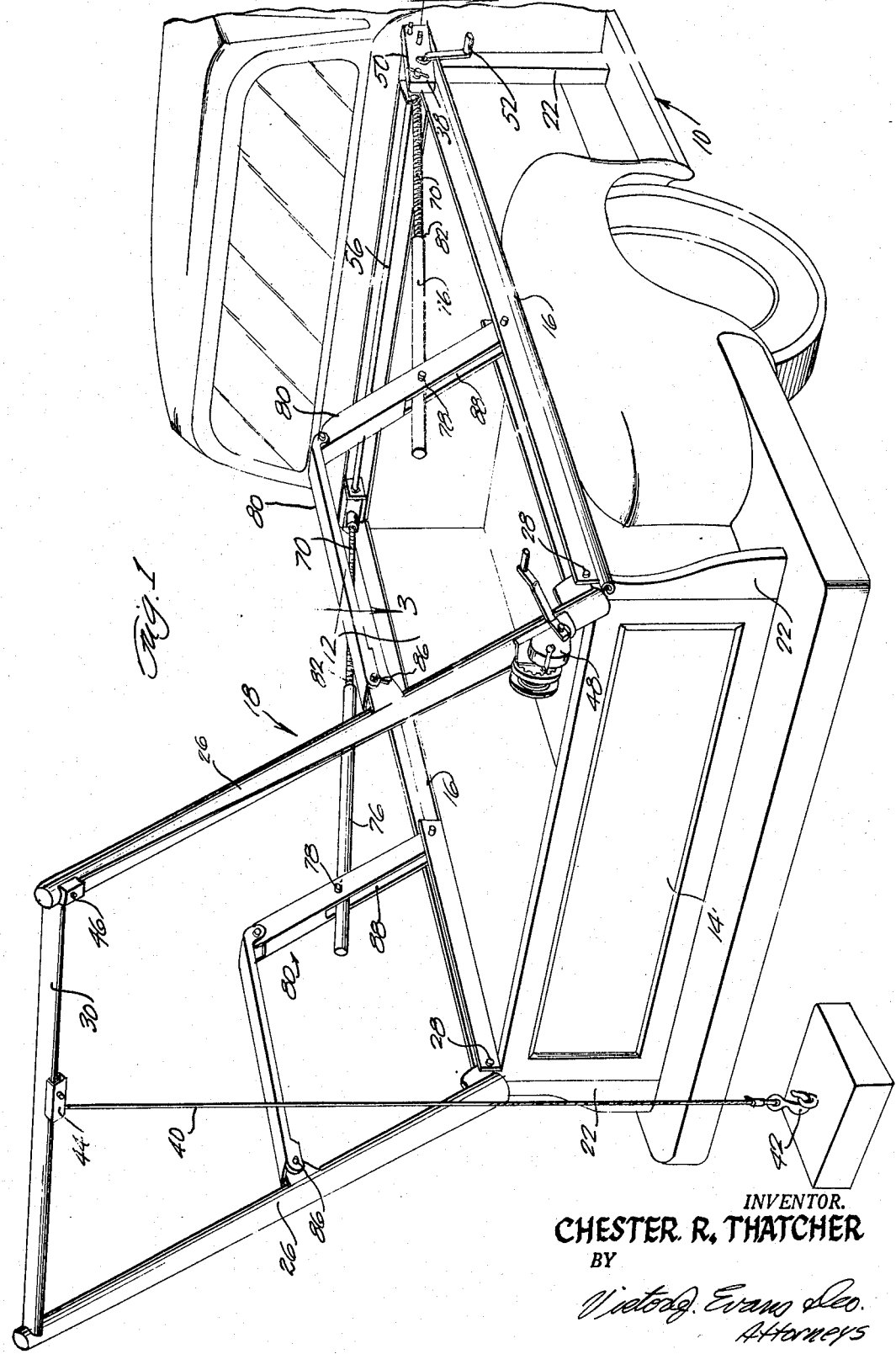
FIGURE 1 is a generally rear perspective view of a loading device according to the present invention for pickup trucks, in which the embodiment shown is a mechanical operated apparatus.

Referring now to the drawings, there is shown a pickup truck or other type vehicle 10 in FIGS. 1–4, in which the pickup panel 12 has a generally U-shaped rigid portion and a removable tailgate 14. On the stationary components of the frame 12, there are positioned a subframe 16 of the loading device 18, so that the subframe 16 follows the general contour of the stationary or fixed portion 12 of the vehicle bed. The subframe 16 is secured to the vehicle by anchor posts or anchor means 22 which attach the loader 18 to the vehicle bed 12 throughout several portions of the length of the subframe. The anchor posts may be inserted into stake pockets 22, 22, and are pinned therein or otherwise secured thereto.

From the aft end of the U-shaped frame 16, there is a mast 26, 26 hingedly connected to the ends of the U-shaped frame 16 by a pin means 28. The masts are essentially poles, and there is a crossbar 30 that connects the ends of the masts together. The masts 26, 26 are carried in a normally stored position over the subframe, as shown in the end of the dotted line 34 of FIG. 2, and may be raised and lowered by a mechanical power attachment 38 which is more particularly shown in FIGS. 3 and 4. A hydraulic system may also be used, and this is shown more particularly in FIGS. 5–8.

There is shown in the drawings a cable 40 and a hook 42, the line 40 being passed through a set of sheaves 44, 46, to a winch 48 for winding and unwinding the line 40 as the load at the end of the hook 42 is raised and lowered, accordingly. The line or cable 40 may also engage a set of rollers operable with the sheaves so that the rollers maintain the cable lined up with the sheaves 44, 46 in all positions.

The embodiment shown in FIGS. 1–4 comprises the mechanical attachment for the loading device for pickup trucks and other type vehicles, in which there are provided gearboxes 50, 50 as particularly shown in FIGS. 3 and 4, with a selection of gears so that a choice of speed in turning a crank arm 52, shown in FIG. 1, may be thereby provided. This is important for various types of load weights that are provided on the hook 42. The crank arm 52 may be a snap-on crank, and in order to facilitate the changing gear ratios, the crank arm 52 may be connected to either of the shafts 54 of the gearbox 50. A cross-shaft 56 extends from the gearbox 50 to the gearbox 50 so that power is coupled from the gear works 60, 60 in a manner to facilitate the transmission and synchronizing of power to both sides and consequently to each of the masts 26, 26. The gear works 60, 60 comprise miter gears 62, 64, and the miter gears are in a housing 66, with a bearing 68 that is press fit with respect to the housing. The bearing 68 is shown at both ends of the housing 66, the inside bearing being provided to carry the cross-shaft 56, and the outside bearing 68 being provided to carry the housing 66 and allow it to pivot as the unit 60 is raised and lowered, accordingly. The gear works 60 transmits power to and from the screw shafts 70, 70, in which there are thrust bearings 72 to reduce the friction of the screw shafts. The other thrust bearing 74, 74 on the screw shafts 70, 70, respectively, is to provide the elimination of friction for the opposite direction to that of the thrust bearings 72, so that one provides and carries the thrust for an outward push direction and the other for an inward pull direction. The screw shafts 70 extend through a telescopic guide 76, 76, as shown in FIG. 1, which is coupled by a pin 78, 78 to a set of parallelogram lift arms 80, 80, and the screw shaft 70 engages the telescopic guide 76, 76, by a set of screw nuts 82, 82 mounted within the forward end of the telescopic guide 76, 76.

The lift arms 80, 80 are arranged to form the set of parallelogram forces and are provided to give rigidity and added height for the attachment of the lift arms 80 to the mast 26 at a pivotal or hingedly connected means 86, 86. The lift arms 80 are attached to the telescopic guide 76, as shown, by pins 78 to allow the pivotal action of the lift arms, and the lift arms 80 have open centers 88 for the telescopic guides to work and pass through.

In the gearbox 50 there is provided a ratchet brake 90, shown in FIG. 4, to hold the gears in a fixed and given position so that the load on the hook 42 may be held in a suspended position.

To operate the loading device from a normally stored position on the vehicle bed 16, the crank 52 is attached to the desired shaft outlet 54 of gearbox 50 which when turned actuates the screw shafts 70, 70, through the gear works 60, 66, to act on the parallelogram set of arms 80 which raises the mast 26, 26 from the normally stored position on the bed of the vehicle 10, to a raised position, as shown in FIG. 1. Then the cable 40 and the hook 42 are lowered by turning the crank arm of the winch 48 so that the object to be loaded is secured thereto. The winch 48 retracts the cable 40 through the sheaves 44, 46, and the lifting of the load is continued until it is in a position to clear the bed of the vehicle 10. Then the turn crank handle 52 is turned after the ratchet brake has been removed from engaging the gear and gearbox 50, and the crank arm 52 is turned in an opposite direction to bring the masts 26, 26 toward a down position until the load on hook 42 is in the desired position over the bed of the vehicle 10. The load is then lowered with the winch 48 to the bed of the vehicle. The hook may then be removed and brought to a position adjacent the sheave 44 by turning the winch 48 to a position for storing it, and the masts 26, 26 may then be continuously lowered until at rest on the subframe 16 of the loading device. To unload the pickup truck, the reverse procedure described above may be followed.

The hydraulically operated embodiment of the invention is shown in a hydraulic attachment 100, as shown in FIG. 5–9, which consists essentially of a pump 102, a storage tank 104, a four-way control valve 106 which may be mounted for operation in a location near the winch 48. The four-way control valve has built in adjustable relief valves and are hydraulically coupled to hydraulic power cylinders 108, 108. The hydraulic power cylinders are connected to intermediate portions of the masts 26, 26 and the subframe 16, as shown in FIGS. 5 and 6. The upper end of the cylinders 108, 108 is coupled to a flange plate 112 by a pin or hinge connection 114, and the lower or stable end of the cylinders 108, 108 is connected to the subframe 16 at pins 116, 116.

By actuation of the control valve 106, fluid power from the tank 104 is drawn through the pump 102 and discharged under pressure to the control valve 106, the control valve being used to select the desired flow of fluid to the cylinders 108, 108, through piping 120, 120 attached to the subframe 16. The control valve 106 has a self-centering return spring (not shown) to relocate the valve to a given neutral position which will hold the masts 26, 26 in one of any desired positions as determined at the time that the control valve is released for following through on the self-centering action. A flexible hose 122, 122 is used in the lines between the cylinders 108, 108 and piping 120, 120 to permit flexing of the lines. A return line 126 with a check valve 128 therein is provided between the control valve 106 and the tank 104 to allow return of the fluid in the line to the tank, and to check air from entering back into the system. In this way, air tends to rise and be withdrawn from the system. A restrictor means 132 is also selectively installed in the return line 126 to hold back fluid on discharge so as not to allow the masts 26, 26 from descending too rapidly.

In operating the hydraulic arrangement, as shown in FIGS. 5–9, from its normally stored position on the vehicle bed, it is necessary to place the power source or pump 102 into motion and then place the hydraulic control valve 106 into the desired position to actuate the hydraulic cylinders 108, 108, so that the mast is raised from the normal position with respect to the vehicle bed into a raised position, such as shown in FIG. 5. The control valve 106 is then returned to a neutral or given position by the spring effect (not shown) which allows the hydraulic fluid to bypass to the tank 104. Then the cable and hook 40, 42, may be conveniently lowered and attached to an object or load to be lifted. The winch 48 provides for taking up the cable 40 through the sheaves 44, 46 and lifting the load by the hook 42 to a position to clear the bed of the vehicle. Now the hydraulic control valve 106 is placed in an opposite position from that initially used to actuate the hydraulic cylinders toward a downward position until the load on hook 42 is in a desired position over the bed of the vehicle 10. Then the load is lowered by the winch 48 to the bed of the vehicle, and the hook is removed from the load. The hook is then raised with the winch 48 to a position against sheave 44. Now the mast may be lowered continuously until it rests against the bed or contour of the vehicle to which it is rested, as shown in FIG. 6, by actuation of the hydraulic control valve as above described. The hydraulic power source or pump 102 may now be disengaged. In order to provide the unloading operation, the reverse process or procedure above described is used.

Several embodiments of the invention have been shown and suggested in the above description. It should be understood that the specific apparatus herein illustrated and described are intended to be representative only, as many changes may be made therein without departing from the clear teachings of the invention. Accordingly, reference should be made to the following claims in determining the full scope of the invention.

What is claimed is:

1. A loading device for pickup trucks and the like, comprising a U-shaped frame forming a subassembly for being received and secured to a U-shaped contoured bed of a pickup truck, a mast hingedly connected at the rear end of each U-shaped frame of said subassembly, a crossbar connecting the free ends of said masts, the rest position of the mast and crossbar being adjacent the contoured portion of the bed of the pickup truck, means to raise and lower the mast into a load position from the rest position and return thereto, a winch mounted at the base portion on one of said masts to lift a load by a cable and hook so that a load may be removed and emplaced in the truck.

2. A loading device for pickup trucks and the like, comprising a U-shaped frame forming a subassembly contoured and configured to be shaped contiguous with the U-shaped contour of a bed of a pickup truck, a set of masts wherein each is hingedly connected at the rear end of the U-shaped frame of said subassembly, a crossbar connected between the free ends of said masts, means to raise and lower the masts into a load position, sheaves mounted in the intermediate portion of the crossbar and at the end of one of the masts for directing a cable for lifting a load by the crossbar and winding and unwinding the cable upon a winch mounted at one end of one of the masts, for thereby loading and unloading a load to and from the truck.

3. The invention according to claim 1, wherein said means for raising and lowering the masts comprises a gearbox mounted at the corners of the U-shaped frame and having a common shaft interconnecting said gearboxes, a parallelogram of lift arms intercoupled with the U-shaped frame and the masts, a screw shaft engaging a telescopic shaft through a screw nut, means on the telescopic shaft to drive the parallelogram of lift arms into said load and rest position, respectively, said screw shaft being driven by a gear coupling to said common shaft, and a snap-on crank for coupling a crank to a selected gear of said gearbox.

4. The invention according to claim 1, wherein said means for raising and lowering the masts includes a hydraulic pump, a four-way valve, a hydraulic cylinder fed by fluid lines mounted and carried by said subassembly so that said cylinder extends the mast into a raise position when extended, and to lower the mast when withdrawn, said four-way valve selecting the direction of flow to said hydraulic cylinder and the rate of driving the mast into said respective positions.

References Cited by the Examiner
UNITED STATES PATENTS

| | | | |
|---|---|---|---|
| 1,464,131 | 8/1923 | Goodger | 214—75 |
| 2,433,598 | 12/1947 | Chadwick | 212—8 X |

GERALD M. FORLENZA, *Primary Examiner.*

R. G. SHERIDAN, *Assistant Examiner.*